United States Patent [19]
Black et al.

[11] Patent Number: 5,662,082
[45] Date of Patent: Sep. 2, 1997

[54] PRE-COMBUSTION CHAMBER FOR INTERNAL COMBUSTION ENGINE AND METHOD OF MANUFACTURE THEREOF

[75] Inventors: Art Black, Houston; Tom Riggs, Tomball, both of Tex.

[73] Assignee: Compressor Engineering Corporation, Houston, Tex.

[21] Appl. No.: 567,432

[22] Filed: Dec. 5, 1995

[51] Int. Cl.$^6$ ............................................. F02B 19/16
[52] U.S. Cl. ............................... 123/254; 29/888.01
[58] Field of Search .................... 123/254, 266, 123/267, 41.32; 29/888.01

[56] References Cited

U.S. PATENT DOCUMENTS

| | | | |
|---|---|---|---|
| 1,539,133 | 5/1925 | Markle et al. | 123/41.32 |
| 2,528,081 | 10/1950 | Rodnesky | 123/266 |
| 4,074,664 | 2/1978 | Rollins | 123/267 |
| 4,524,744 | 6/1985 | Adams | 123/267 |
| 5,230,313 | 7/1993 | Bisel et al. | 123/266 |
| 5,431,140 | 7/1995 | Faulkner | 123/254 |

*Primary Examiner*—Andrew M. Dolinar
*Attorney, Agent, or Firm*—Robert C. Curfiss; Butler & Binion

[57] ABSTRACT

A pre-combustion chamber is adapted to be installed in the spark plug well of an existing engine. The pre-combustion chamber includes an inner combustion chamber housing and an outer cooling jacket housing. The two housing are assembled in such a manner to permit movement therebetween during thermal cycling to minimize stress and fatigue fracture. A resilient seal is installed between the housings.

18 Claims, 2 Drawing Sheets

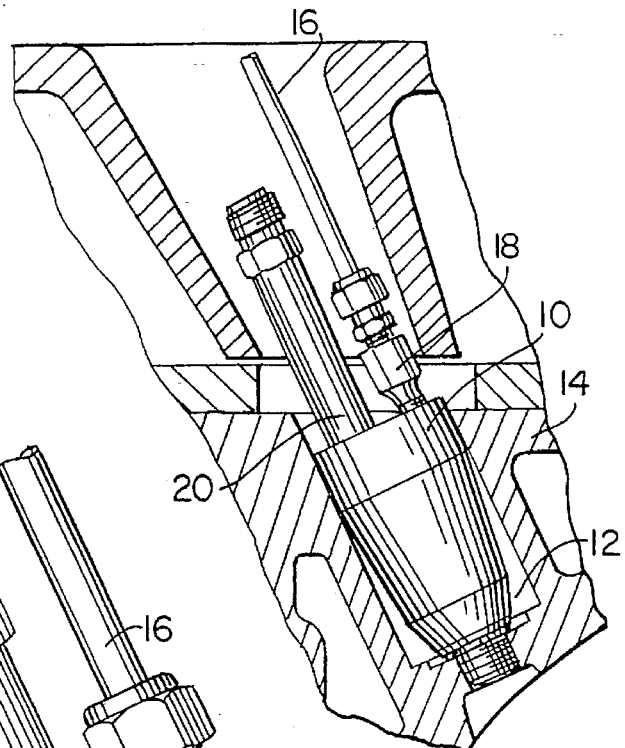
FIG. 1
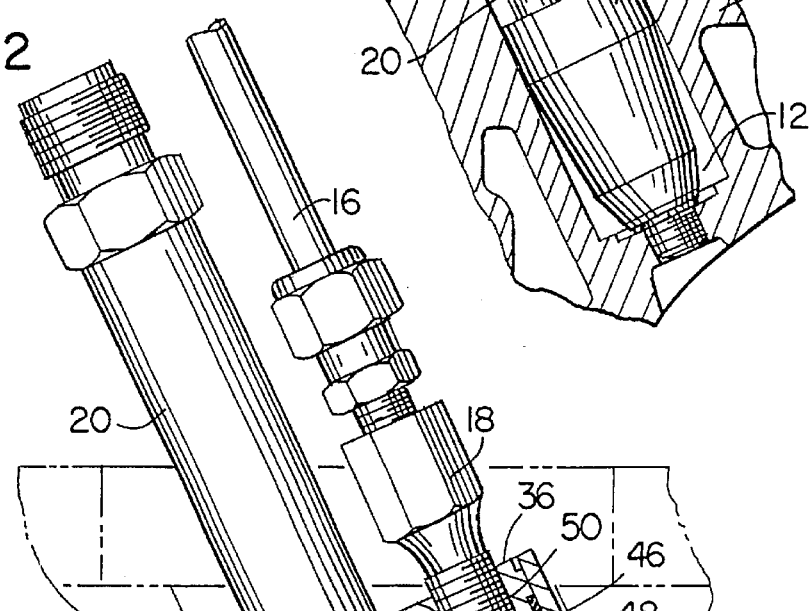
FIG. 2
FIG. 4
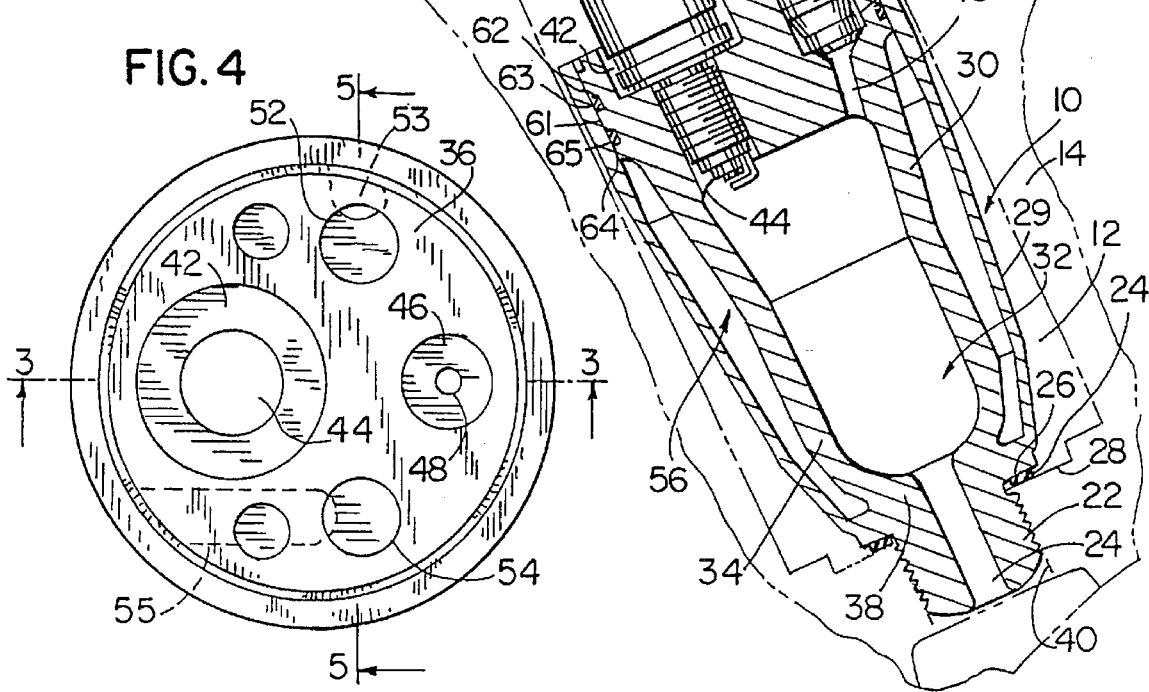

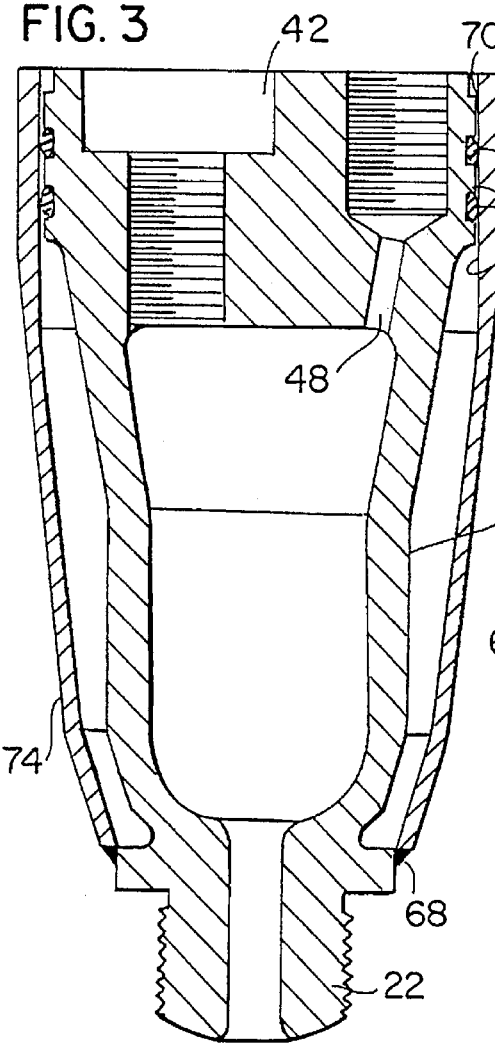
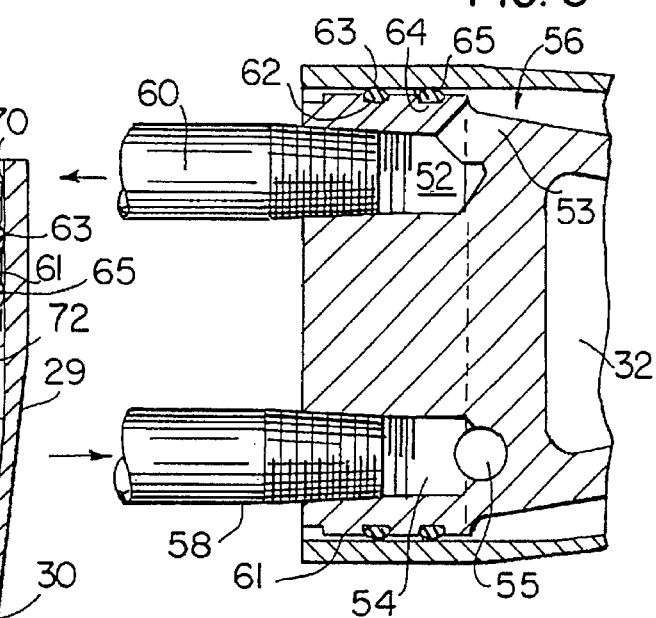
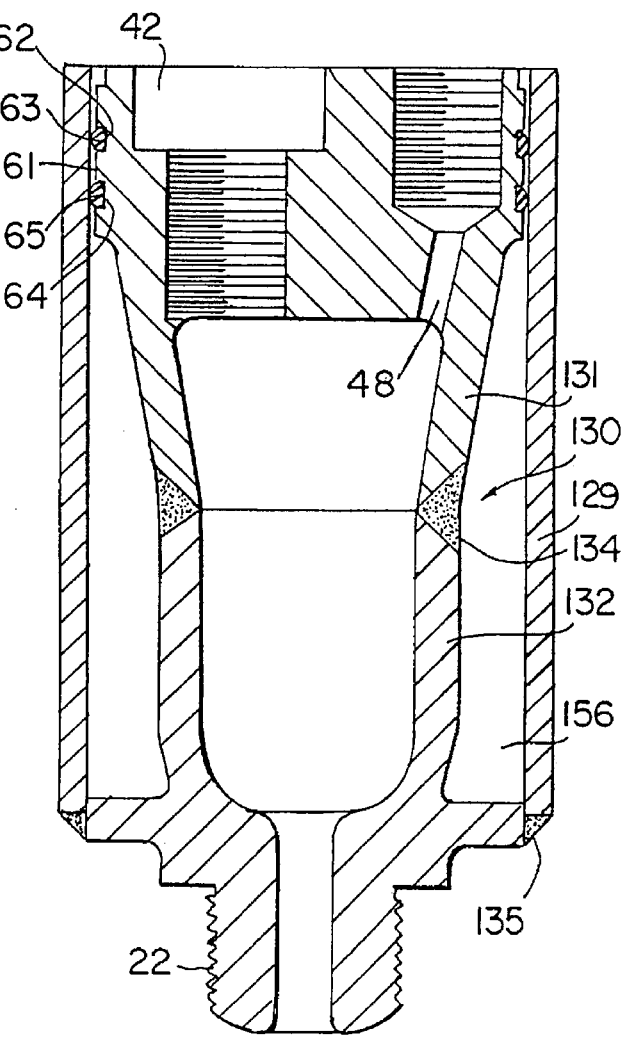

PRE-COMBUSTION CHAMBER FOR INTERNAL COMBUSTION ENGINE AND METHOD OF MANUFACTURE THEREOF

BACKGROUND OF THE INVENTION

1. Field of the Invention

The subject invention generally relates to pre-combustion apparatus for reducing emissions in internal combustion engines, and is specifically directed to a self-contained pre-combustion chamber adapted to be field retrofitted in an internal combustion engine.

2. Description of the Prior Art

The use of a pre-chamber in an engine cylinder head is well known. As early as 1876, an Otto engine included an explosion canal in the cylinder head to improve ignition and enhance combustion. The explosion canal was designed to draw in a rich mixture at the very end of the intake stroke, whereby that portion of the charge was exposed to the igniter flame, creating a strong jet of flame which blasted into the combustion chamber for ensuring a quick, positive burning of the total charge. Pre-chamber technology was routinely utilized in high speed racing engines of the 1920's. Cooper-Bessemer incorporated a jet cell in 1938 to achieve charge stratification in the combustion chamber.

The original application of the pre-chamber in gas engines was in the Fairbanks-Morse two-cycle opposed piston engine, used extensively in the electric power generation industry. While the initial interest in pre-combustion chamber technology was to permit use of alternative fuels or to even out the operation of inefficient engines at low speed and low load, this technology has current value because of the emission reduction resulting from the use of pre-combustion systems, even in today's more efficient engines. With the enactment of the Clean Air Act of 1977, conventional engines could no longer meet the emission requirements.

Recently, a number of designs have been tried to improve the emission rating of such engines. One such design is the Cooper CleanBurn design which employs a jet cell igniter installed in the conventional head in place in one of the spark plug wells. The jet cell igniter incorporates a small pre-chamber into which a conventional spark plug is installed and an additional supply of fuel is introduced through a check valve. The timing of the auxiliary fuel supply into the cylinder is accomplished by the differential pressure existing across the check valve. When pressure in the main cylinder and pre-chamber is lower than the fuel supply pressure to the igniter, the check valve will open and fuel will flow into the pre-chamber. When the main chamber and pre-chamber pressure rises to a level higher than the auxiliary fuel supply pressure the check valve will close and block the flow of auxiliary fuel. More recently, pre-chambers have been incorporated in both four-cycle and two-cycle engines in order to reduce emission levels. While very successful in achieving lower emissions, the cost factor in upgrading to engines including pre-chambers in prohibitive. While many engines are "grandfathered" in, it is becoming more and more difficult to meet emission requirements without use of a pre-chamber.

It is now possible to retro-fit older engines by placing the pre-chamber in one spark plug well. While such applications are successful in reducing emissions, the life span of the pre-combustion chamber assembly is substantially less than that of the engine, per se. This is primarily due to the rapid heat change within the pre-combustion chamber, resulting in stress cracking and accelerated fatiguing of the assembly. Therefore, there remains a need for a longer life pre-combustion chamber assembly which can be retrofit on existing engines.

SUMMARY OF THE INVENTION

The subject invention is directed to a pre-combustion chamber uniquely designed to permit expansion and contraction due to thermal cycling without stress or fatigue fracture. The chamber is designed to be installed in the spark plug well of the engine, and is configured to fit in the well with a minimum of modification to the well, if required at all, making field retrofitting possible.

The preferred embodiment of the invention incorporates an integral design having a lower tip including an external thread adapted to be received in a suitably tapped spark plug hole. A sealing gasket, such as by way of example, a conventional spark plug gasket is placed between the engine head and the chamber. The pre-combustion chamber is in-line with the spark plug hole and is double walled to permit external cooling of the chamber. The inner wall defines the pre-combustion chamber. The outer wall is spaced outwardly from the inner wall and forms a jacket surrounding the pre-combustion chamber. The space between the walls defines a cooling jacket of a suitable coolant, such as water, permitting the heat of the pre-combustion chamber to be dissipated. A fuel inlet and fuel delivery system introduces fuel into the pre-combustion chamber in the well-known manner. The spark plug is mounted in direct communication with the pre-combustion chamber. In operation, the spark plug is utilized to ignite the fuel rich/air ratio in the pre-combustion chamber, generating an ignition flame which is released through the lower tip of the pre-combustion chamber to ignite the fuel lean/air ratio in the main combustion chamber.

A unique feature of the pre-combustion chamber of the subject invention is its forgiving design, permitting the chamber assembly to expand and contract during thermal cycling without stress or fatigue fracture. In the preferred embodiment, the cooling jacket shell is an integral member of the assembly. However, one end of the assembly is floating to permit free movement of the chamber wall relative to the jacket wall. Redundant seals are placed between the walls to assure sealing of the cooling jacket.

In the preferred embodiment, resilient O-ring seals are utilized, but other sealing mechanisms may be utilized where desired. Also, the use of redundant seals is not necessary, but incorporation of the redundant architecture greatly increases the reliability of the design.

The pre-combustion chamber design of the subject invention is constructed by welding one end of the cooling jacket body onto the chamber body after the seals have been installed, providing a permanent assembly. The resulting assembly is a rigid, durable design with good thermal cycling characteristics, greatly improving the life of the pre-combustion chamber over that of known designs.

It is, therefore, an object and feature of the subject invention to provide an improved pre-combustion chamber assembly adapted to be retrofitted into the spark plug well of an existing internal combustion engine.

It is another object and feature of the subject invention to provide a pre-combustion chamber assembly with good thermal expansion and contraction performance.

It is an additional object and feature of the subject invention to provide a pre-combustion chamber assembly having an integral cooling jacket which may float relative to the chamber walls during thermal cycling.

Other objects and features of the invention will be readily apparent from the drawings and the detailed description of the preferred embodiment.

BRIEF DESCRIPTION OF THE DRAWINGS

FIG. 1 is a partial cross-section of an internal combustion engine with the pre-combustion chamber of the subject invention installed in a spark plug hole thereof.

FIG. 2 is an enlarged view, looking in the same direction as FIG. 1 and showing the pre-combustion chamber of the subject invention in longitudinal cross-section.

FIG. 3 is a longitudinal cross-section of the pre-combustion chamber removed from the engine, and looking in the same direction as FIG. 2, taken generally along the lines 3—3 of FIG. 4.

FIG. 4 is a top view of the pre-combustion chamber.

FIG. 5 is a partial section view taken along line 5—5 of FIG. 4.

FIG. 6 is an alternative embodiment of the pre-combustion chamber of the subject invention, looking in the same direction as FIG. 3.

DETAILED DESCRIPTION OF THE PREFERRED EMBODIMENTS

The pre-combustion chamber assembly of the preferred embodiment of the invention is shown in FIGS. 1–5. An alternative embodiment is shown in FIG. 6. As particularly shown in FIG. 1, the pre-combustion chamber 10 of the present invention is typically installed in the spark plug well 12 of a standard engine 14. A fuel supply line 16 is connected directly to the chamber assembly, typically through a check-valve 18. The particular check-valve utilized is a matter of choice. However, the preferred check valve is shown and described in our co-pending application, Ser. No. 08/568,507 filed Dec. 7, 1995, incorporated by reference herein. The spark plug 20 is installed. In operation, a fuel is introduced directly into the pre-combustion chamber through line 16 and check valve 18 and ignited by spark plug 20. As best shown in FIG. 2, the ignited fuel/air mix, then expands and is expelled through the nozzle art he spark plug connector end 22 of the chamber assembly. Typically, a seal or gasket 24 is provided between the outer face 26 of the assembly and the seat surface 28 of the spark plug well.

In the preferred embodiment, the chamber assembly is of integral construction and is defined by a pre-combustion chamber housing member 30 having an interior cavity 32 for defining the combustion chamber. The chamber housing 30 is surrounded by a cooling housing 29, with a space 56 therebetween for defining a cooling jacket chamber (see FIG. 2). The chamber housing 30 includes an exterior, generally cylindrical side wall 34 and, as drawn, a closed top 36 and closed bottom 38. The nozzle or connector end 22 extends outwardly from the closed bottom 38 and is externally threaded to be received in the original spark plug hole 40. The closed top 36 includes a recessed spark plug seat 42 and a through hole 44, suitably tapped to receive the spark plug 20. The closed top 36 also includes a recessed seat 46 for seating the check valve 18 and a through hole 48, through which the fuel is introduced into the combustion chamber 32, see FIG. 2. In the preferred embodiment, the peripheral wall of the check valve is externally threaded at 50, and is received in the mated, tapped hole defined by recessed seat 46, to facilitate assembly, and to seal the check valve/pre-combustion chamber against leaks.

As best shown in FIG. 4, the assembly also includes coolant holes 52 and 54, located in the closed top 36 in the preferred embodiment. These holes communicate directly with the cooling jacket chamber 56 (see FIGS. 2 and 5), via interior passageways 53 and 55, respectively. As best shown in FIG. 5, a coolant inlet tube 58 and a coolant outlet tube 60 is connected to holes 54, 52, respectively, for continuously cooling the combustion chamber 32 when in operation. The preferred coolant is water, however, other coolants may be used as desired.

In the preferred embodiment of the invention, and as shown in FIGS. 1–5, the lower end 22, pre-combustion chamber housing 30 and the closed top 36 are of a unitary construction. The holes, threads and taps are then added, along with finishing the exterior to size. A pair of circumferential channels 62, 64 are provided in the side wall 61 of the closed top portion. The side wall is machine finished to size and resilient O-ring seals 63, 65 are placed in channels 62, 64, respectively.

The cooling housing 29 is separately formed, and after final machining of the chamber housing assembly is completed and the O-rings 63, 65 are added, the cooling housing 29 is welded to the chamber housing 30, as shown at 68, see FIG. 3, completing the final assembly. As best shown in FIG. 3, and shown exaggerated in the drawings for clarity, there is a clearance gap 70 between the sidewall 61 of the closed top of the pre-combustion chamber and the interior side wall 72 of the cooling housing 29. This permits the pre-combustion chamber housing 30 to move axially relative to the cooling housing 29 during thermal cycling, virtually eliminating stress and fatigue cracking of the assembly.

In the preferred embodiment of FIGS. 1–5, the lower end 74 of the cooling housing is of reduced diameter to facilitate retrofitting in existing spark plug wells. Using a smaller profile permits less modification of the original spark plug well in order to accommodate the pre-combustion chamber assembly of the invention.

An alternative embodiment of the precombustion chamber of the subject invention is shown in FIG. 6. The primary difference is that the cooling housing 129 is a straight cylinder, rather than tapered as cooling housing 29 of FIGS. 1–5. This is particularly useful where additional cooling volume is required, since it results in a larger cooling chamber 156. Also, when it is desired to have a machined surface on the interior side walls of the combustion chamber 32, the combustion chamber housing 130 may be made in sections 131 and 132, and welded at 134 after finishing. As in the preferred embodiment, the cooling housing 129 is welded to the assembled and finished chamber housing 130, as shown at 135. The remaining features of the embodiment of FIG. 6 correspond to like features of the preferred embodiment of FIGS. 1–5.

While certain embodiments and features of the invention have been described in detail herein, it will be readily understood that the invention incorporates all enhancements and modifications within the scope and spirit of the following claims.

What is claimed is:

1. A pre-combustion chamber apparatus adapted to be retrofit into the spark plug well of an existing engine, the precombustion chamber including:
   a. an inner combustion chamber housing have a fuel inlet and an igniter connector, the inner combustion chamber housing including an outer wall;
   b. an outer cooling housing substantially surrounding the inner combustion chamber housing and having an interior wall;
   c. a connector secured to and in communication with the interior of the inner combustion chamber and adapted for mounting the pre-combustion chamber in the spark plug well of the engine;

d. a permanent securing and sealing element for securing a portion of the cooling housing to the combustion chamber housing; and e. a resilient seal positioned between the outer wall of the combustion chamber housing and the cooling housing for defining a cooling jacket chamber therebetween, sealed and closed by the seal and the permanent securing element.

2. The apparatus of claim 1, wherein there is further included a second resilient seal in series with said resilient seal, to provide redundancy.

3. The apparatus of claim 1, wherein the chamber housing includes a portion with a cylindrical outer wall and the cooling housing includes a portion with a cylindrical inner wall, said resilient seal being positioned therebetween.

4. The apparatus of claim 3, wherein there is further included a circumferential channel for seating the resilient seal.

5. The apparatus of claim 4, wherein the circumferential channel is in the cylindrical outer wall of the chamber housing.

6. The apparatus of claim 1, wherein the resilient seal is an O-ring.

7. The apparatus of claim 1, wherein the permanent securing and sealing element is a weldment.

8. The apparatus of claim 1, further including through passageways for communicating the cooling jacket chamber with the exterior for introducing a coolant therein.

9. The apparatus of claim 8, wherein the through passageways are provided in the chamber housing.

10. The apparatus of claim 1, wherein the igniter comprises a spark plug.

11. The apparatus of claim 1, wherein the fuel inlet includes a check valve.

12. A pre-combustion chamber apparatus adapted to be retrofit into the spark plug well of an existing engine, the precombustion chamber including:

a. an inner combustion chamber housing having a fuel inlet and a spark plug well, the inner combustion chamber housing including an outer cylindrical wall portion;

b. an outer cooling housing substantially surrounding the inner combustion chamber housing and having a interior cylindrical wall portion;

c. a connector secured to and in communication with the interior of the inner combustion chamber and adapted for mounting the pre-combustion chamber in the spark plug well of the engine;

d. a portion of the cooling housing permanently welded to the combustion chamber housing; and e. a resilient seal positioned between the outer cylindrical wall portion of the combustion chamber housing and inner cylindrical wall portion of the cooling housing for defining a cooling jacket chamber therebetween, sealed and closed by the seal and weldment.

13. The apparatus of claim 12, wherein there is further included a second resilient seal in series with said resilient seal.

14. The apparatus of claim 12, wherein there is further included a circumferential channel for seating the resilient seal.

15. The apparatus of claim 14, wherein the circumferential channel is in the cylindrical outer wall of the chamber housing.

16. A method for assembling a pre-combustion chamber apparatus of the type including an inner pre-combustion chamber housing and an outer cooling jacket housing, the method comprising the steps of:

a. first finishing the pre-combustion chamber housing;

b. thereafter installing a resilient seal on the exterior of the pre-combustion chamber housing;

c. thereafter installing the cooling jacket housing over the pre-combustion chamber housing and the seal; and d. permanently securing the cooling jacket housing to the pre-combustion chamber housing.

17. The method of claim 16, wherein the securing step comprises welding.

18. The method of claim 16, wherein a plurality of redundant seals are installed in step "b".

* * * * *

UNITED STATES PATENT AND TRADEMARK OFFICE
CERTIFICATE OF CORRECTION

PATENT NO. : 5,662,082
DATED : September 2, 1997
INVENTOR(S) : Art Black, et. al.

It is certified that error appears in the above-identified patent and that said Letters Patent is hereby corrected as shown below:

Column 3, line 38, change "art he" to --at the--.

Signed and Sealed this

Tenth Day of February, 1998

Attest:

BRUCE LEHMAN

Attesting Officer

Commissioner of Patents and Trademarks